United States Patent
Badarinarayan et al.

(10) Patent No.: US 8,555,858 B2
(45) Date of Patent: Oct. 15, 2013

(54) HIGH PRESSURE FUEL PIPE CONSTRUCTION FOR AN INTERNAL COMBUSTION ENGINE

(75) Inventors: Harsha Badarinarayan, Canton, MI (US); Akira Inoue, Farmington Hills, MI (US); Takashi Yoshizawa, Novi, MI (US); Atsushi Hohkita, Novi, MI (US); Hiroaki Saeki, West Bloomfield, MI (US); Hiroshi Ono, Novi, MI (US); Masahiro Soma, Danville, KY (US); William T. Harvey, Brighton, MI (US); Steven J. Miller, Livonia, MI (US); Su-Wei Sung, Ann Arbor, MI (US)

(73) Assignee: Hitachi, Ltd, Tokyo (JP)

( * ) Notice: Subject to any disclaimer, the term of this patent is extended or adjusted under 35 U.S.C. 154(b) by 171 days.

(21) Appl. No.: 13/237,132

(22) Filed: Sep. 20, 2011

(65) Prior Publication Data

US 2012/0006914 A1   Jan. 12, 2012

Related U.S. Application Data

(63) Continuation of application No. 12/414,795, filed on Mar. 31, 2009, now Pat. No. 8,038,178.

(51) Int. Cl.
*F02M 55/02* (2006.01)
*F16L 27/04* (2006.01)

(52) U.S. Cl.
USPC ......... 123/468; 123/469; 285/261; 285/334.2

(58) Field of Classification Search
USPC ............... 123/456, 468, 469; 285/261, 334.2
See application file for complete search history.

(56) References Cited

U.S. PATENT DOCUMENTS

| 290,196 | A | * | 12/1883 | Abel | 285/145.3 |
|---|---|---|---|---|---|
| 1,425,635 | A | * | 8/1922 | Dod | 285/121.7 |
| 2,421,691 | A | * | 6/1947 | Gibson, Jr. et al. | 285/101 |
| 3,361,450 | A | * | 1/1968 | Franck | 285/271 |
| 3,404,904 | A | * | 10/1968 | Roe | 285/145.3 |
| 3,847,684 | A | | 11/1974 | Amick | |

(Continued)

FOREIGN PATENT DOCUMENTS

EP    0615480 A1    9/1994

OTHER PUBLICATIONS

Hassan et al. Stability of Nugget Zone Grain Structures in High Strength Al-Alloy Friction Stir Welds During Solution Treatment, Acta Materialia 51 (2003) 1923-1936.

(Continued)

*Primary Examiner* — Thomas Moulis
(74) *Attorney, Agent, or Firm* — Gifford, Krass, Sprinkle, Anderson & Citkowski, P.C.

(57) ABSTRACT

A high pressure fuel pipe construction for an internal combustion engine, such as a direct injection engine. A conduit for the fuel is open at each end and a ball having a throughbore is slidably positioned over one end of the conduit. A reinforcing sleeve is positioned inside the end of the conduit so that the sleeve extends entirely through the ball. The sleeve, ball and the end of the conduit are then brazed together to attach the ball and conduit together. A double chamfer is provided at one end of the ball throughbore to facilitate inspection of the brazing quality. Additionally, a loop is formed in the conduit and a dampener is attached to the loop.

16 Claims, 3 Drawing Sheets

(56) References Cited

U.S. PATENT DOCUMENTS

| | | | | |
|---|---|---|---|---|
| 4,295,452 A | * | 10/1981 | Lembke et al. | 123/470 |
| 4,669,761 A | * | 6/1987 | Huling | 285/330 |
| 4,776,615 A | * | 10/1988 | Young | 285/121.7 |
| 5,261,705 A | * | 11/1993 | Takahashi et al. | 285/197 |
| 5,460,247 A | * | 10/1995 | Fouts | 188/71.1 |
| 5,529,643 A | | 6/1996 | Yoon et al. | |
| 5,556,484 A | | 9/1996 | Blankenship, Jr. et al. | |
| 5,584,947 A | | 12/1996 | Raymond et al. | |
| 5,658,022 A | * | 8/1997 | Shi et al. | 285/148.23 |
| 6,045,028 A | | 4/2000 | Martin et al. | |
| 6,186,121 B1 | * | 2/2001 | Uematsu et al. | 123/468 |
| 6,206,603 B1 | * | 3/2001 | Graham | 403/128 |
| 6,374,805 B1 | * | 4/2002 | Seymour et al. | 123/456 |
| 6,374,806 B1 | * | 4/2002 | Keeley et al. | 123/456 |
| 6,408,826 B2 | * | 6/2002 | Asada et al. | 123/468 |
| 6,409,853 B1 | | 6/2002 | Thamboo et al. | |
| 6,415,768 B1 | * | 7/2002 | Usui | 123/468 |
| 6,497,220 B1 | * | 12/2002 | Boecking | 123/469 |
| 6,543,671 B2 | | 4/2003 | Hatten et al. | |
| 6,638,381 B2 | | 10/2003 | Keener et al. | |
| 6,712,916 B2 | | 3/2004 | Mishra et al. | |
| 6,935,377 B2 | * | 8/2005 | Furugen | 138/109 |
| 7,114,489 B2 | * | 10/2006 | Wenke et al. | 123/456 |
| 7,216,676 B2 | * | 5/2007 | Barnhouse et al. | 138/177 |
| 7,455,212 B2 | | 11/2008 | Mika | |
| 7,469,680 B2 | * | 12/2008 | Merchant et al. | 123/456 |
| 7,516,735 B1 | * | 4/2009 | Doherty et al. | 123/468 |
| 7,562,648 B1 | * | 7/2009 | Wagner et al. | 123/468 |
| 7,740,162 B2 | | 6/2010 | Ilyushenko et al. | |
| 8,038,178 B2 | * | 10/2011 | Badarinarayan et al. | 285/288.1 |
| 8,186,724 B2 | * | 5/2012 | Kato et al. | 285/386 |
| 8,196,967 B2 | * | 6/2012 | Seifert et al. | 285/14 |
| 8,402,946 B2 | * | 3/2013 | Mehring et al. | 123/456 |
| 2006/0108394 A1 | | 5/2006 | Okaniwa et al. | |
| 2006/0163873 A1 | * | 7/2006 | Langhuber et al. | 285/386 |
| 2006/0284421 A1 | * | 12/2006 | Fonville et al. | 285/386 |
| 2007/0297935 A1 | | 12/2007 | Langan et al. | |
| 2008/0230584 A1 | | 9/2008 | Lederich et al. | |
| 2013/0025107 A1 | * | 1/2013 | Higgins et al. | 29/428 |

OTHER PUBLICATIONS

Attallah et al., Friction Stir Welding Parameters: A Tool for Controlling Abnormal Grain Growth During Seubequesnt Heat Treatment, Materials Science and Engineering A 391 (2005) 51-59.

Talwar et al., "Friction Stir Welding of Airframe Structures", Jun. 28, 2000, Boeing, p. 1-10.

"Alloy 7075 Plate and Sheet", Alcoa, p. 1-4.

* cited by examiner

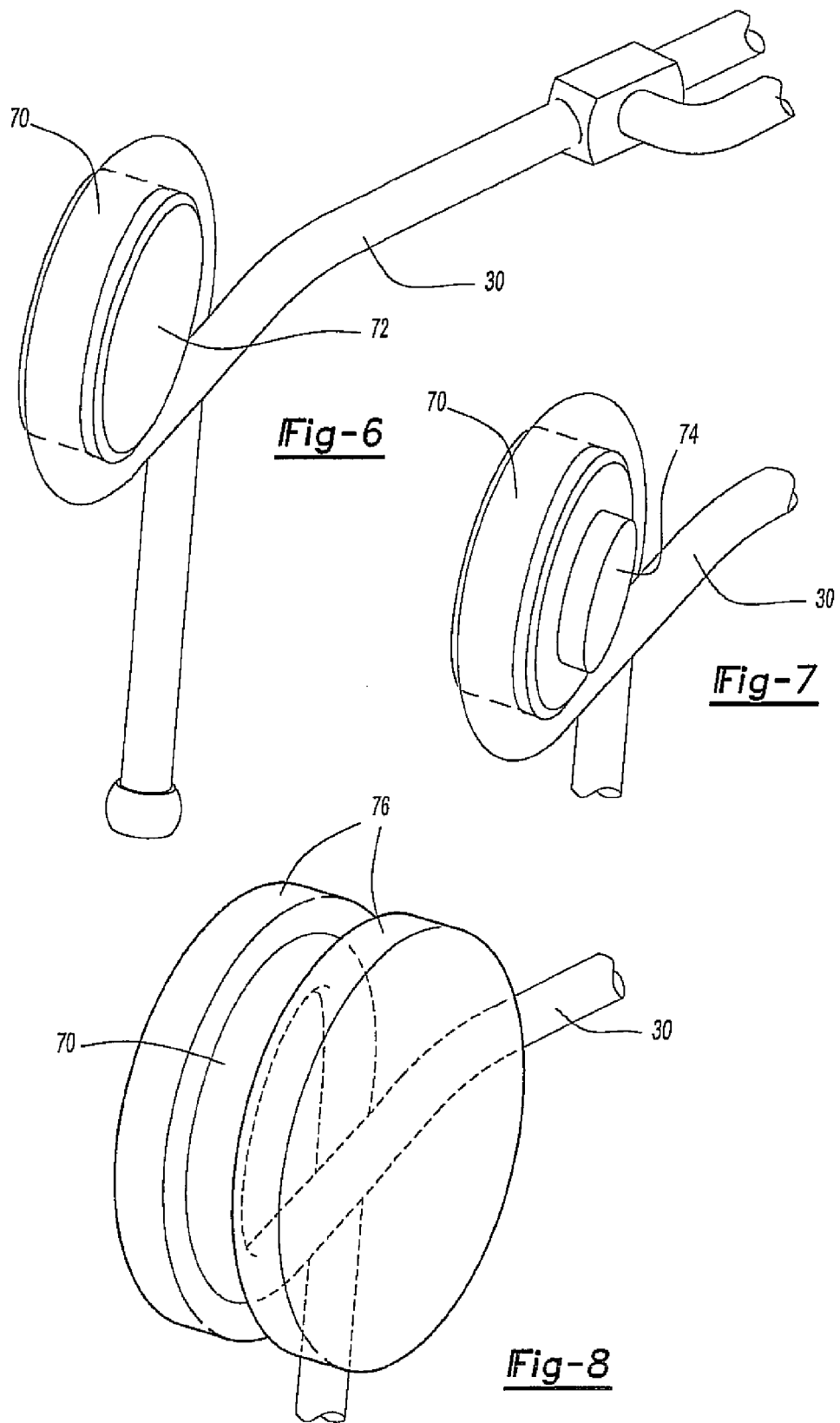

HIGH PRESSURE FUEL PIPE CONSTRUCTION FOR AN INTERNAL COMBUSTION ENGINE

CROSS-REFERENCE TO RELATED APPLICATIONS

This application is a continuation of U.S. patent application Ser. No. 12/414,795 filed Mar. 31, 2009.

BACKGROUND OF THE INVENTION

I. Field of the Invention

The present invention relates generally to fuel systems for internal combustion engines and, more particularly, to a high pressure fuel pipe construction particularly suited for a direct injection engine.

II. Description of Related Art

Many modern internal combustion engines of the type used in the automotive industry rely upon high pressure fuel injection to supply fuel to the engine. Typically, a rigid metal conduit has one end attached to the outlet from a high pressure fuel pump while the opposite end of the conduit is open to a fuel rail. Conventionally, a ball is attached to each end of the fuel conduit and this ball is received within a like shaped seat on both the fuel pump outlet as well as the fuel rail for the fuel injectors. Nuts then secure the balls to their seat at both the fuel rail as well as the fuel pump.

The previously known fuel conduits have proven adequate for many types of internal combustion engines, such as multipoint injection engines. However, modern day internal combustion engines increasingly utilize direct injection into the engine combustion chamber for increased efficiency and fuel economy. Since the fuel injector for direct injection engines must overcome the high pressures present within the internal combustion engine, the previously known fuel systems for direct injection engines require higher fuel pressure than the previously known multipoint fuel injection systems.

The fuel supply systems for direct injection engines are subjected to increased mechanical stress as contrasted with the previously known multipoint fuel injection systems. This increased mechanical stress results not only from engine vibration imparted directly to the fuel delivery system, but also high pressure pulsations from the fuel pump itself. In extreme cases, this high mechanical stress imposed upon the fuel system can cause a failure of the fuel delivery system. Such failures may result in cracks formed between the connection of the ball couplings at the ends of the fuel supply conduit.

Although thicker tubing may be used as the fuel supply conduit, such thicker tubing increases not only the cost of the fuel system, but also its weight.

SUMMARY OF THE PRESENT INVENTION

The present invention provides a high pressure fuel pipe construction for internal combustion engines which overcomes the above-mentioned disadvantages of the previously known systems.

In brief, the high pressure fuel pump construction of the present invention comprises a conduit constructed of a rigid material, such as metal. The conduit is open at each end and one end of the conduit is fluidly attached to the fuel pump while the opposite end of the conduit is attached to one or more fuel rails for the fuel injectors.

In order to create the fluid coupling between both the fuel supply conduit and the fuel rail, as well as between the fuel conduit and the fuel pump, a fluid coupling ball is brazed or otherwise secured to the end of the conduit. This ball is dimensioned to nest within a seat in the fuel rail inlet as well as a similar seat in the fuel pump outlet. As before, a coupling nut at each end of the fluid conduit threadably secures the balls within and against their respective seats to form the fluid coupling.

Unlike the previously known fuel systems, however, a sleeve constructed of a rigid material, such as metal, is press fit into at least one end of the fuel conduit so that the sleeve extends not only into the end of the fuel conduit, but also through the ball. The ball, sleeve and end of the fluid conduit are then fixedly secured together, preferably by brazing, to form a fluid-tight connection between the ball and the conduit.

In practice, the additional sleeve extending through the ball and into the end of the conduit serves to rigidify the conduit at its connection with the ball by effectively increasing the thickness of the fluid conduit in the area around the ball. In practice, the addition of the sleeve sufficiently rigidifies the connection between the ball and the fluid conduit against failure due to mechanical stress without unnecessarily increasing the weight and cost of the entire fuel supply conduit.

In order to ensure an adequate braze connection between the ball, sleeve and conduit, preferably the ball includes a conic shaped opening at at least one end that is concentric with the ball throughbore. An indicator line is formed on the conic opening at a position such that, if brazed material fills the conic opening above the indicator line, the braze is satisfactory. Preferably, the indicator line is formed by providing a double chamfer on the ball concentrically with its throughbore.

In order to further dampen vibrations of the fluid conduit, the fluid conduit also preferably includes a loop between its ends. A dampener made of a resilient material, such as an elastomeric material, is then attached to the loop. The dampener may be either contained within the loop or, alternatively, encompass the loop. Optionally, a high density mass is attached to the dampener to further offset vibrations in the fluid conduit which would otherwise be caused by the fuel pump and/or engine.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 6 is an elevational view of the fuel pipe construction with an attached dampener;

FIG. 7 is an elevational view illustrating a modification of the dampener of FIG. 6; and FIG. 8 is a view similar to both FIGS. 6 and 7, but illustrating still a further modification thereof.

DETAILED DESCRIPTION OF PREFERRED EMBODIMENTS OF THE PRESENT INVENTION

Figure 1:
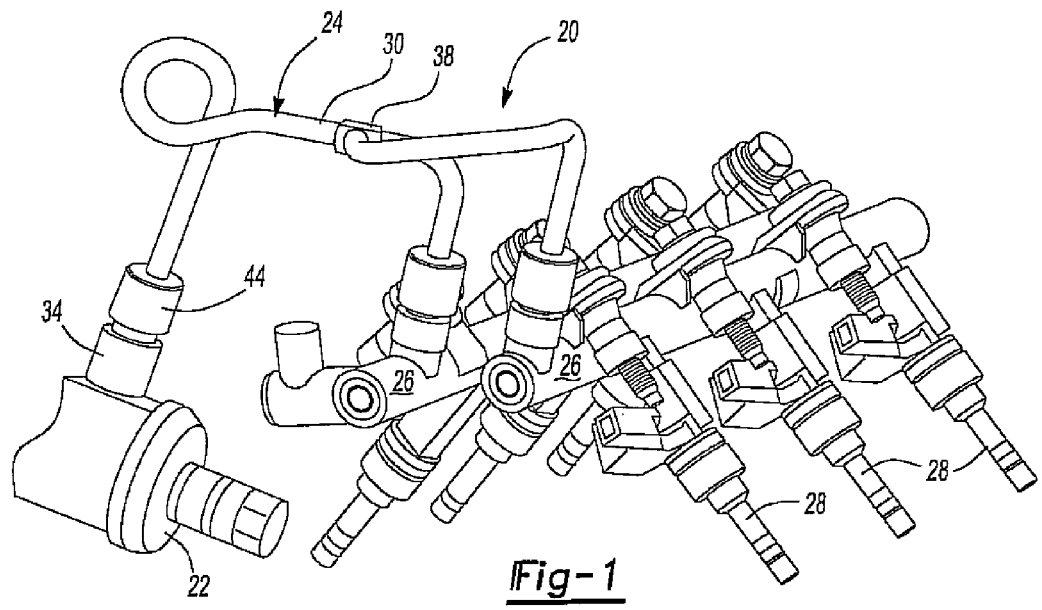
FIG. 1 is an elevational view of a fuel system for a direct injection engine.

With reference first to FIG. 1, a portion of a fuel injection system 20 for a high pressure internal combustion engine, such as a direct injection engine, of the type used in the automotive industry is shown. The fuel delivery system 20 includes a high pressure fuel pump 22 which pumps fuel from a fuel tank (not shown), through a high pressure fuel pipe construction 24 and to one or more fuel rails 26. A plurality of fuel injectors 28 are then fluidly connected to the fuel rails 26 to supply fuel to the engine.

Figure 2:
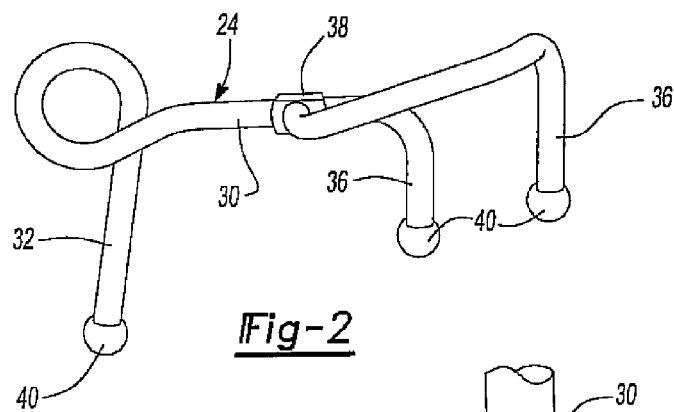
FIG. 2 is an elevational view of the high pressure fuel pipe construction for the direct injection engine.

With reference now to FIGS. 1 and 2, the high pressure fuel pipe construction 24 includes an elongated fuel supply conduit 30 made of a rigid material, such as metal. The conduit 30 is open at both ends and one end 32 of the conduit 30 is fluidly connected to an outlet 34 from the fuel pump 22 while the other ends 36 of the fuel conduit 30 are fluidly connected to the fuel rails 26. A T junction 38 in the conduit is provided to accommodate the second fuel rail 26.

Figure 3:
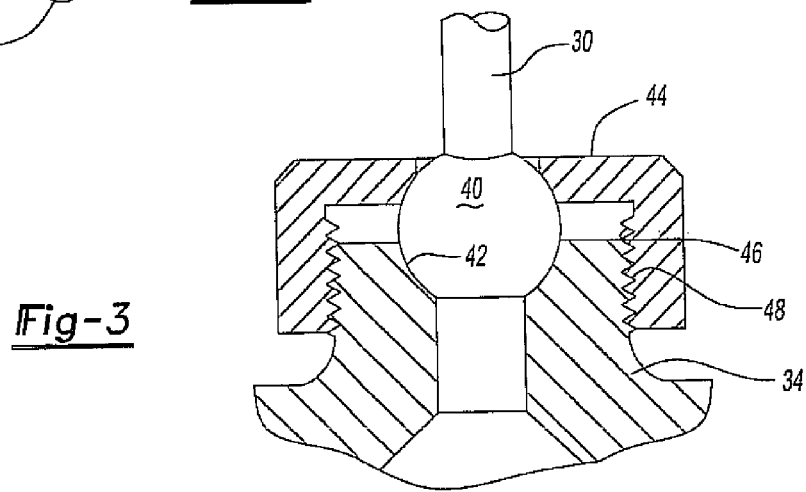
FIG. 3 is a sectional view illustrating one compression fitting for the present invention.

With reference now to FIGS. 1-3, a ball 40 is attached to each open end of the fuel conduit 30. Each ball 40 includes a throughbore 50 (FIG. 4) which registers with the interior of the fuel conduit 30 to permit fuel flow through the ball 40.

With reference now particularly to FIG. 3, a compression fitting is used to fluidly connect the balls 40 to the fuel pump outlet 34 or fuel rails 26. Since the compression fittings between the fuel pump outlet 34 and the fuel rails 26 are substantially the same, only the connection with the fuel pump outlet 34 will be described in detail, it being understood that a like description should also apply to the fluid connection between the fuel conduit 30 and the fuel rails 26.

With reference still to FIG. 3, the fuel pump outlet 34 includes a seat 42 which is complementary in shape to the outer periphery of the ball 40. A nut 44 is slidably disposed over the fuel conduit 30 which includes internal threads 46. These internal threads 46 threadably engage external threads 48 formed around the seat 42. Upon tightening of the nut 44, the nut 44 engages the ball 40 and compresses it against the seat 42 thus fluidly sealing the ball 40 to the seat 42.

Figure 4:
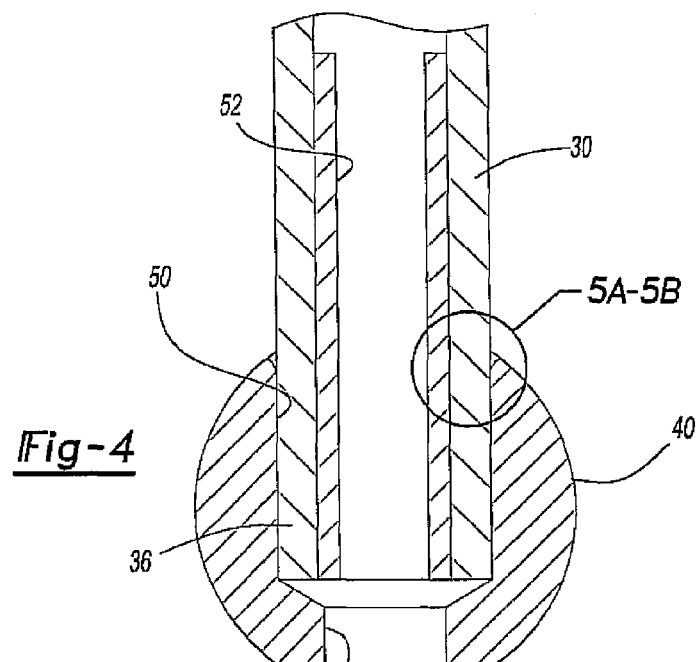
FIG. 4 is a longitudinal sectional view illustrating an end of the fuel pipe construction.

With reference now to FIG. 4, the connection between the fuel conduit 30 and the ball 40 is shown in greater detail. In order to strengthen the fuel conduit 30 against mechanical stresses caused not only by vibration of the engine, but also by vibrations from the fuel pump 22, a copper clad or copper preform sleeve 52 is press fit into the interior of the fuel conduit 30. The sleeve 52, furthermore, is dimensioned so that the sleeve 52 has a length greater than the diameter of the ball 40.

At least a portion of the ball throughbore 50 is the same size as the outside diameter of the fuel conduit 30 and ends in a reduced diameter portion 51 at one end of the throughbore 50. In order to attach the ball 40 to the fuel conduit 30, after insertion of the sleeve 52 into the conduit 30, the ball 40 is pressed onto the end 36 of the fluid conduit. In doing so, the interior of the fuel conduit 30 is fluidly coupled to the ball throughbore 50.

Figures 5A, 5B:
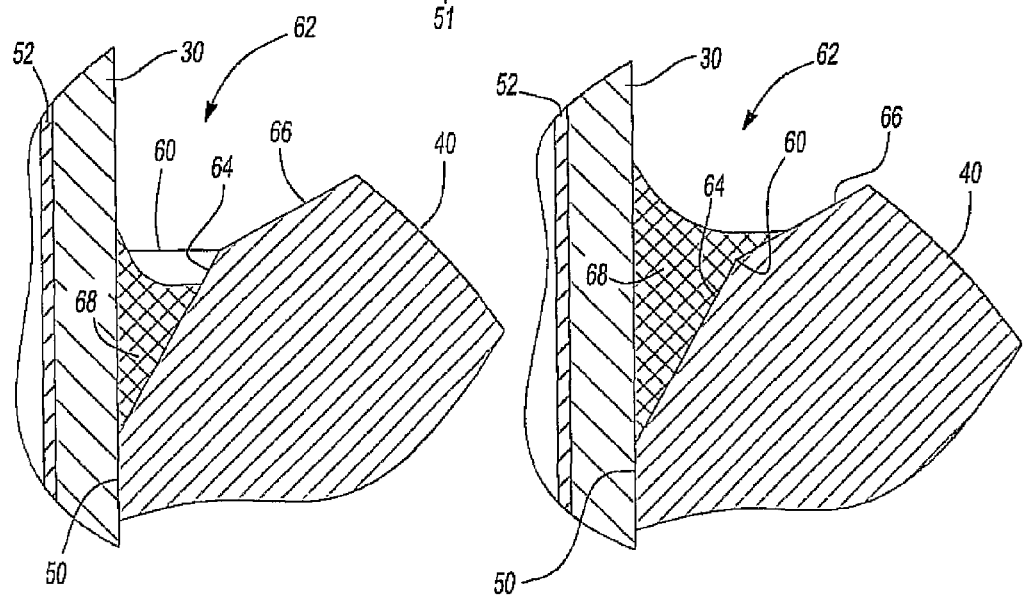
FIGS. 5A and 5B taken around circle 5A-5B in FIG. 4 and are both fragmentary sectional views illustrating respectively an unacceptable braze and an acceptable braze.

With reference now to FIGS. 5A and 5B, in order to secure the reinforcing sleeve, fuel conduit 30 and ball 40 together, the ball 40, sleeve 52 and fluid conduit 30 are preferably brazed together. In order to facilitate inspection of the braze to ensure that it meets acceptable qualities, an indicator line 60 is provided around a conical recess 62 at one end of the ball throughbore 50. Preferably, this indicator line 60 is formed by the intersection of two chamfers 64 and 66 which intersect each other at the indicator line 60. The chambers 64 and 66 are formed at different angles.

If the brazing material 68 following the brazing operation fails to rise above the indicator line 60 as shown in FIG. 5A, the braze is unsatisfactory. Conversely, if the braze material 68 rises above the indicator line 60 following the brazing operation as shown in FIG. 5B, the braze is satisfactory.

With reference now to FIG. 6, in order to dampen vibration of the fuel conduit 30 during operation of the engine, the conduit 30 preferably includes a loop 70 formed between its ends. A dampener 72 formed of a resilient material, such as an elastomeric material, is then positioned within and attached to the interior of the loop 70. In operation, vibrations within the conduit 30 are effectively dampened by the dampener 72.

With reference now to FIG. 7, a modification of the dampener 72 is shown. In FIG. 7, a mass 74 of a high density material, such as metal, is attached to the dampener 72. This high density material 74 offsets the vibration in the fluid conduit 30 caused by the operation of the invention thereby dampening vibration and reducing noise caused by such vibration.

With reference now to FIG. 8, a still further embodiment of the dampener is shown in which the loop 70 is sandwiched in between two discs 76 of dampening material. The dampener illustrated in FIG. 8 may be formed from any suitable material, such as a resilient material or an elastomeric material.

From the foregoing, it can be seen that the present invention provides a high pressure fuel pipe construction for use in internal combustion engines, such as direct injection engines, which not only strengthens the fuel pipe against mechanical strain, but also reduces vibration, and the resultant noise, of the fuel pipe. Having described our invention, however, many modifications thereto will become apparent to those skilled in the art to which it pertains without deviation from the spirit of the invention as defined by the scope of the appended claims.

We claim:

1. A fuel injection system comprising:
   a conduit open at a first and second end;
   a ball having a throughbore, at least a portion of said throughbore dimensioned to slidably receive said first end of said conduit; and
   a sleeve positioned inside said conduit,
   wherein said ball and said sleeve is attached to said conduit adjacent said first end of said conduit,
   wherein the diameter of the internal side of the conduit is same at said first end of the conduit and at a part touching an end of the sleeve apart from the first end of said conduit.

2. The fuel injection system according to claim 1, wherein the diameter of the internal side of the conduit is constant where sleeve is positioned.

3. The fuel injection system according to claim 1, wherein said sleeve has a length larger than the length of the ball in a direction of a fuel flow through said conduit.

4. The fuel injection system according to claim 1, wherein said sleeve comprises a copper clad sleeve.

5. The fuel injection system according to claim 1, further comprising:
   a fuel pump; and
   a fuel rail coupled to a first end of said conduit and coupled to a plurality of fuel injectors,
   wherein said sleeve is positioned so that said conduit is reinforced at a portion touching a first end of said throughbore, where said throughbore has said first end and a second end, and the second end of the throughbore is closer to said fuel rail than the first end of the throughbore.

6. The fuel injection system according to claim 5, further comprising:
a damper made of a resilient elastic material;
wherein said conduit includes a loop formed between said first and second ends of the conduit, and said damper is placed around said loop to reduce the vibration of said conduit during operation of an engine.

7. The fuel injection system according to claim 6, wherein said ball, said sleeve and said conduit are brazed together, and wherein said fuel pump is coupled to second end of said conduit.

8. The fuel injection system according to claim 1, wherein said first end of said throughbore includes an indicator line representative of an acceptable braze joint.

9. The fuel injection system according to claim 8, wherein said indicator line comprises an intersection of two chamfers formed in said ball coaxially with said ball throughbore.

10. The fuel injection system according to claim 6, wherein said dampener comprises a pair of compressible discs, said discs disposed on opposite sides of said loop.

11. A fuel injection system comprising:
a conduit open at a first and second end;
a ball having a throughbore, at least a portion of said throughbore dimensioned to slidably receive said first end of said conduit;
a fuel rail coupled to said first end of the conduit via said ball;
a fuel pump outlet coupled to said second end of said conduit; and
a sleeve positioned inside said conduit, said sleeve is attached at the first end of said conduit,
wherein said sleeve has a length larger than the length of the ball in a direction of a fuel flow through said conduit.

12. The fuel injection system according to claim 11, further comprising:
a damper made of a resilient elastic material;
wherein said conduit includes a loop formed between said first and second ends of the conduit, and said damper is placed around said loop to reduce the vibration of said conduit during operation of an engine.

13. The fuel injection system according to claim 12, wherein said sleeve comprises a copper clad sleeve.

14. The fuel injection system according to claim 13, wherein the diameter of the internal side of the conduit where the sleeve is not positioned is larger than the diameter of the internal side of the sleeve.

15. The fuel injection system according to claim 14, wherein said ball, said sleeve and said conduit are brazed together.

16. The fuel injection system according to claim 15, wherein said first end of said throughbore includes an indicator line representative of an acceptable braze joint, and
wherein said indicator line comprises an intersection of two chamfers formed in said ball coaxially with said ball throughbore.

* * * * *